(12) United States Patent
Heo et al.

(10) Patent No.: US 8,441,608 B2
(45) Date of Patent: May 14, 2013

(54) LIQUID CRYSTAL DISPLAY INCLUDING HEATING ELEMENT BETWEEN BOTTOM COVER AND BACKLIGHT UNIT

(75) Inventors: Jonggu Heo, Seoul (KR); Sunghyun Jeon, Paju-si (KR); Yongseok Lee, Seoul (KR); Youngkyu Bang, Goyang-si (KR)

(73) Assignee: LG Display Co., Ltd., Seoul (KR)

( * ) Notice: Subject to any disclaimer, the term of this patent is extended or adjusted under 35 U.S.C. 154(b) by 98 days.

(21) Appl. No.: 13/159,956

(22) Filed: Jun. 14, 2011

(65) Prior Publication Data
US 2011/0310331 A1    Dec. 22, 2011

(30) Foreign Application Priority Data
Jun. 16, 2010  (KR) .................. 10-2010-0057022

(51) Int. Cl.
*G02F 1/133*    (2006.01)
(52) U.S. Cl.
USPC ........................................................ 349/161
(58) Field of Classification Search ........................ None
See application file for complete search history.

(56) References Cited

U.S. PATENT DOCUMENTS

| | | | | |
|---|---|---|---|---|
| 5,299,038 A | * | 3/1994 | Hamada et al. | 349/161 |
| 5,767,934 A | * | 6/1998 | Goddard | 349/61 |
| 6,133,979 A | * | 10/2000 | Komatsu et al. | 349/161 |
| 6,163,359 A | * | 12/2000 | Smith et al. | 349/161 |
| 6,833,657 B2 | * | 12/2004 | Voto et al. | 313/11 |
| 2011/0255047 A1 | * | 10/2011 | Kim et al. | 349/161 |

FOREIGN PATENT DOCUMENTS

| | | | |
|---|---|---|---|
| JP | 4-95990 A | * | 3/1992 |
| JP | 5-93903 A | | 4/1993 |
| JP | 8-36177 A | * | 2/1996 |
| KR | 10-2006-0087951 A | | 8/2006 |
| KR | 10-2007-0068792 A | * | 7/2007 |
| KR | 10-0829423 B1 | | 5/2008 |

* cited by examiner

*Primary Examiner* — Mike Stahl
(74) *Attorney, Agent, or Firm* — Birch, Stewart, Kolasch & Birch, LLP

(57) ABSTRACT

A liquid crystal display includes a liquid crystal display panel, a backlight unit providing light to the liquid crystal display panel, a bottom cover receiving the backlight unit, and at least one heat generation sheet disposed between the backlight unit and the bottom cover. The at least one heat generation sheet generates a radiant heat for increasing a surface temperature of the liquid crystal display panel.

9 Claims, 8 Drawing Sheets

(A) Before heat generation sheet is applied (B) After heat generation sheet is applied

FIG. 7

| Surface temperature of panel | 3D luminance | | LwRb | LbRw | C/T |
| --- | --- | --- | --- | --- | --- |
| | W | B | | | |
| 31°C (Before heat generation sheet is applied) | 64.7 | 0.10 | 1.74 | 50.5 | 3.25% |
| 40°C (After heat generation sheet is applied) | 64.5 | 0.11 | 1.16 | 54.3 | 1.94% |

LIQUID CRYSTAL DISPLAY INCLUDING HEATING ELEMENT BETWEEN BOTTOM COVER AND BACKLIGHT UNIT

This application claims the priority benefit of Korean Patent Application No. 10-2010-0057022 filed on Jun. 16, 2010, which is incorporated herein by reference for all purposes as if fully set forth herein.

BACKGROUND OF THE INVENTION

1. Field of the Invention

Embodiments of the invention relate to a liquid crystal display capable of improving response characteristic of liquid crystals.

2. Discussion of the Related Art

A range of application for liquid crystal displays has widened because of its excellent characteristics such as light weight, thin profile, and low power consumption. The liquid crystal displays have been used in personal computers such as notebook PCs, office automation equipments, audio/video equipments, interior/outdoor advertising display devices, and the like. A backlit liquid crystal display occupying most of the liquid crystal displays controls an electric field applied to a liquid crystal layer and modulates light coming from a backlight unit, thereby displaying an image.

The backlight unit is classified into a direct type backlight unit and an edge type backlight unit. In the direct type backlight unit, a plurality of light sources are disposed on a lower surface of a diffusion plate, and light from the light sources travels to a back surface of a liquid crystal display panel. On the other hand, the edge type backlight unit includes a plurality of light sources, that are disposed opposite each other on the sides of a light guide plate, and a plurality of optical sheets disposed between the liquid crystal display panel and the light guide plate. In the edge type backlight unit, the light guide plate converts line light or point light coming from the light sources into plane light, and the plane light travels to the back surface of the liquid crystal display panel via the optical sheets.

The liquid crystal displays serve as a display device capable of implementing three-dimensional (3D) image as well as a two-dimensional (2D) image by the development of various contents and circuit technique. The liquid crystal displays require an improvement of response characteristic of liquid crystals, so as to increase the display quality when implementing the 2D image or the 3D image.

Examples of a method for improving the response characteristic of the liquid crystals include (1) a method for changing a cell gap, (2) a method for changing a liquid crystal material to change the physical properties of the liquid crystals, and (3) a method for increasing a surface temperature of the liquid crystal display panel to improve Ton/Toff(turn on time/turn off time) characteristics of the liquid crystals. It is practically difficult to select the methods (1) and (2) because of the technical difficulty and the cost burden.

In the liquid crystal display using the direct type backlight unit, because the light sources of the direct type backlight unit are widely distributed under the liquid crystal display panel, the method (3) is effective in increasing the surface temperature of the liquid crystal display panel. However, it is difficult to achieve the thin profile of the liquid crystal display because of a necessary interval between the diffusion plate and the light sources, and the liquid crystal display using the direct type backlight unit is expensive. Hence, the liquid crystal display using the edge type backlight unit has been intensively developed in recent years.

As described above, because the light sources of the edge type backlight unit are disposed along the side of the light guide plate, it is difficult to transfer heat generated in the light sources to the surface of the liquid crystal display panel. Thus, the surface temperature of the liquid crystal display panel of the liquid crystal display using the edge type backlight unit is lower than that of the liquid crystal display using the direct type backlight unit. Therefore, the response characteristic of the liquid crystals of the liquid crystal display using the edge type backlight unit is worse than that of the liquid crystal display using the direct type backlight unit. When the response characteristic of the liquid crystals is degraded, a motion picture response time (MPRT) when the 2D image is implemented lengthens. Hence, a motion blur appears, and a 3D crosstalk, resulting in a doubled image of left and right eye images of the 3D image, appears.

SUMMARY OF THE INVENTION

Embodiments of the invention provide a liquid crystal display capable of improving a motion picture response time (MPRT) performance and reducing a 3D crosstalk by improving response characteristic of liquid crystals.

In one aspect, there is a liquid crystal display including a liquid crystal display panel, a backlight unit configured to provide light to the liquid crystal display panel, a bottom cover configured to receive the backlight unit, and at least one heat generation sheet disposed between the backlight unit and the bottom cover, the at least one heat generation sheet configured to generate a radiant heat for increasing a surface temperature of the liquid crystal display panel.

The liquid crystal display further includes a light source driver configured to supply a driving power to a light source array of the backlight unit. The at least one heat generation sheet is electrically connected to the light source driver through a power supply line and performs a heat generation operation based on an operation voltage received from the light source driver.

The at least one heat generation sheet includes a heat generation part configured to generate the radiant heat, a first electrode connected to the power supply line, the first electrode configured to supply the operation voltage to the heat generation part, a second electrode connected to a ground power source, the second electrode configured to supply a ground level voltage to the heat generation part, and a base film configured to support the heat generation part, the first electrode, and the second electrode.

The heat generation part includes a carbon material.

The backlight unit is implemented as an edge type backlight unit including a light source array, a light guide plate, that converts light coming from the light source array into plane light and emits the plane light to the liquid crystal display panel, an optical sheet disposed between the liquid crystal display panel and the light guide plate, and a reflection sheet disposed under the light guide plate. In this instance, the heat generation part is disposed between the reflection sheet and a bottom surface of the bottom cover.

The radiant heat generated in the at least one heat generation sheet is transferred to the liquid crystal display panel by sequentially passing through the reflection sheet, the light guide plate, and the optical sheet.

The backlight unit is implemented as a direct type backlight unit including a light source may, a diffusion plate, that diffuses light coming from the light source array and emits the light to the liquid crystal display panel, an optical sheet disposed between the liquid crystal display panel and the diffusion plate, and a reflection sheet disposed under the light source array. In this instance, the heat generation part is disposed between the reflection sheet and the bottom surface of the bottom cover.

The radiant heat generated in the at least one heat generation sheet is transferred to the liquid crystal display panel by sequentially passing through the reflection sheet, the diffusion plate, and the optical sheet.

The light source array includes at least one of a light emitting diode (LED), a hot cathode fluorescent lamp (HCFL), a cold cathode fluorescent lamp (CCFL), and an external electrode fluorescent lamp (EEFL) as a light source.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings:

FIG. 7 illustrates the simulation result of a comparison between 3D crosstalk values before and after a heat generation sheet according to an example embodiment of the invention is applied;

DETAILED DESCRIPTION OF THE ILLUSTRATED EMBODIMENTS

Reference will now be made in detail embodiments of the invention examples of which are illustrated in the accompanying drawings.

Figure 1:
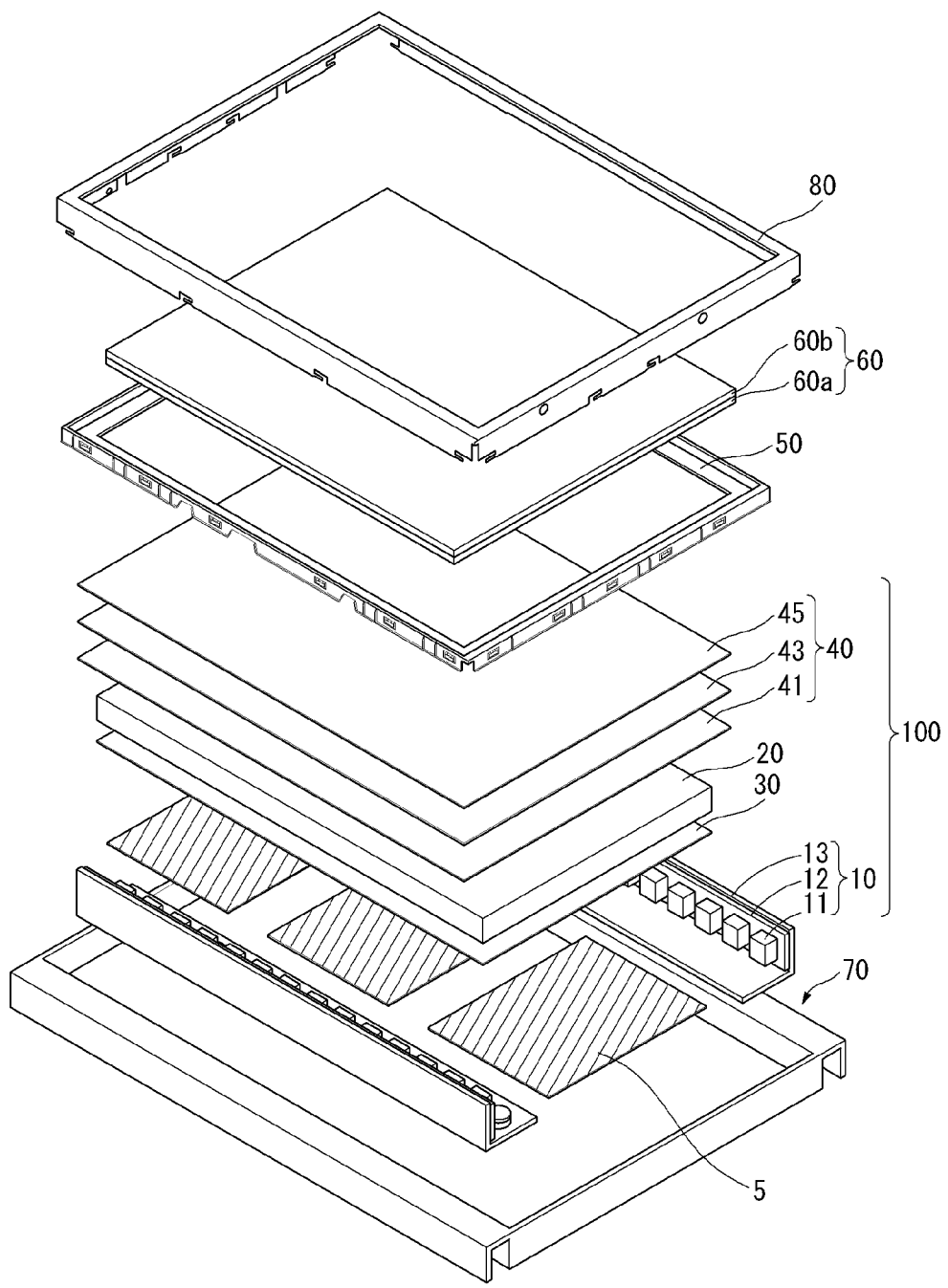
FIG. 1 is an exploded perspective view of a liquid crystal display including an edge type backlight unit according to an example embodiment of the invention.
Figure 2:
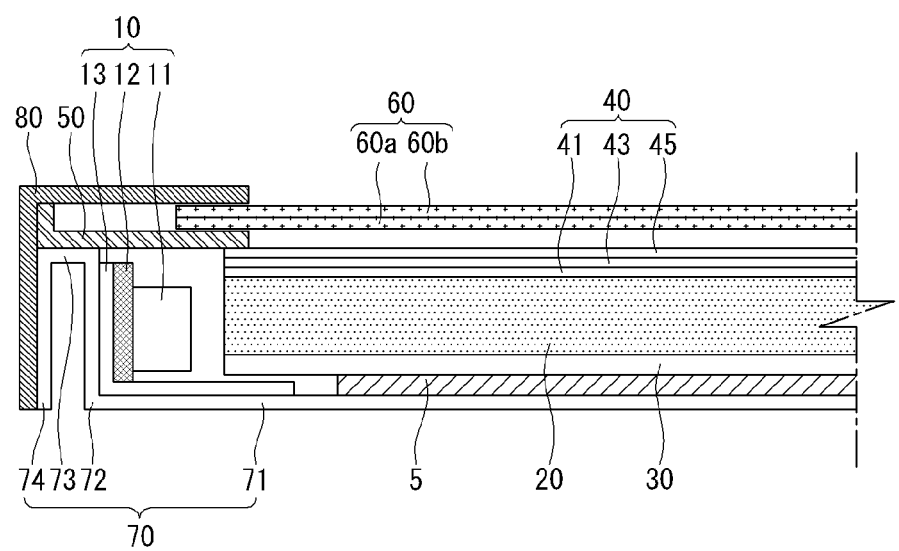
FIG. 2 is a cross-sectional view of the liquid crystal display shown in FIG. 1.
Figure 3A:
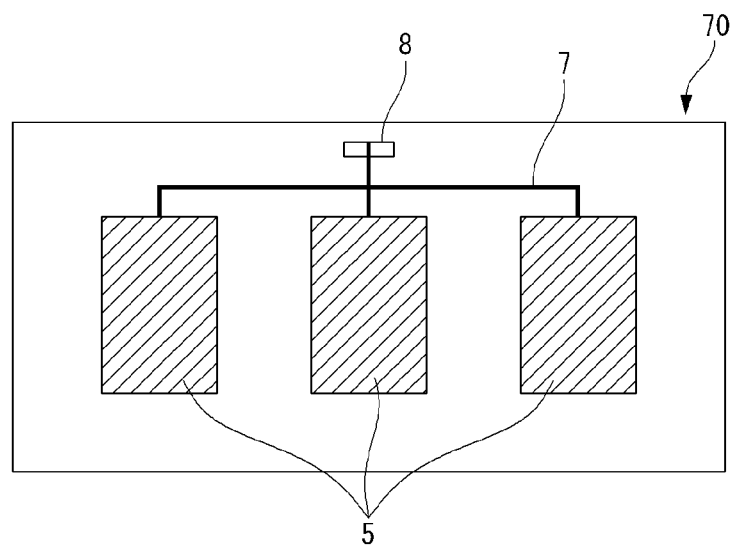
FIGS. 3A and 3B illustrate a connection configuration between a heat generation sheet and a light source driver.
Figure 3B:
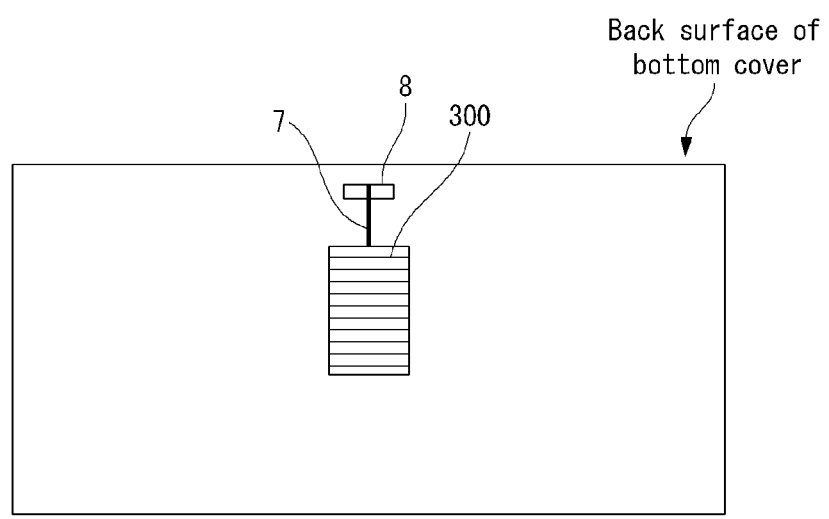

FIG. 1 is an exploded perspective view of a liquid crystal display including an edge type backlight unit according to an example embodiment of the invention. FIG. 2 is a cross-sectional view of the liquid crystal display shown in FIG. 1. FIGS. 3A and 3B illustrate a connection configuration between a heat generation sheet and a light source driver.

As shown in FIGS. 1 and 2, a liquid crystal display according to an example embodiment of the invention includes a liquid crystal display panel 60, a panel guide 50, a backlight unit 100, a heat generation sheet 5, a bottom cover 70, and a top case 80.

The liquid crystal display panel 60 includes a thin film transistor array substrate 60a including thin film transistors and a color filter array substrate 60b, that is positioned opposite the thin film transistor array substrate 60a and includes black matrixes, color filter, etc., thereby displaying an image. The thin film transistor array substrate 60a and the color filter array substrate 60b are attached to each other using a sealant, and a liquid crystal layer is formed between the two substrates 60a and 60b.

The panel guide 50 is a rectangular mold frame, in which a glass fiber is mixed in a synthetic resin such as polycarbonate, and supports the liquid crystal display panel 60.

The backlight unit 100 is implemented as an edge type backlight unit including a light source array 10, a light guide plate 20, that converts light coming from the light source array 10 into plane light and emits the plane light to the liquid crystal display panel 60, a reflection sheet 30 disposed under the light guide plate 20, and a plurality of optical sheets 40 disposed on the light guide plate 20.

The light source array 10 includes a plurality of light emitting diodes (LEDs) 11 used as a light source and a metal printed circuit board (PCB) 12, on which the plurality of LEDs 11 are mounted. The light source array 10 may further include a heat sink 13 for dissipating heat generated in the metal PCB 12 to the bottom cover 70. The light source array 10 may use at least one of a hot cathode fluorescent lamp (HCFL), a cold cathode fluorescent lamp (CCFL), and an external electrode fluorescent lamp (EEFL) as the light source, instead of the LEDs 11.

The side of the light guide plate 20 is positioned opposite the plurality of LEDs 11. The light guide plate 20 converts light coming from the LEDs 11 into plane light and emits the plane light to the plurality of optical sheets 40 disposed on the light guide plate 20. The light guide plate 20 may be formed of a material having a good refractive index and a good transmittance, for example, polymethylene methacrylate (PMMA), polycarbonate (PC), polyethylene (PE), and cyclo olefin polymer (COP). Other materials may be used.

The reflection sheet 30 disposed under the light guide plate 20 reflects light travelling to the bottom of the light guide plate 20 toward the top of the light guide plate 20, i.e., the liquid crystal display panel 60, thereby increasing the efficiency of the light.

The plurality of optical sheets 40 are disposed between the liquid crystal display panel 60 and the light guide plate 20, increase the uniformity of the light from the light guide plate 20, and increase a luminance of the light by refracting and focusing the light. The plurality of optical sheets 40 include a diffusion sheet 41, a prism sheet 43, and a protective sheet 45. The diffusion sheet 41 diffuses the light from the light guide plate 20. The prism sheet 43 includes a triangular microprism and focuses the light diffused by the diffusion sheet 41 in a direction perpendicular to the surface of the liquid crystal display panel 60. The protective sheet 45 protects the prism sheet 43 weak to a scratch.

The bottom cover 70 receives the backlight unit 100. For this, the bottom cover 70 includes a horizontal part 71, a first side wall part 72, that is bent upward from the horizontal part 71 so that the light source array 10 is fastened thereto, a support part 73, that is bent from the first side wall part 72 in a horizontal direction to support the panel guide 50, and a second side wall part 74, that is bent downward from the support part 73 and is positioned opposite the first side wall part 72. The horizontal part 71 may include a protrusion for supporting the light guide plate 20 and the reflection sheet 30.

The top case 80 is manufactured using a metal material and is fixed to at least one of the panel guide 50 and the bottom cover 70 using a hook (not shown) or a screw (not shown). The top case 80 surrounds the side of the panel guide 50 and the side of the bottom cover 70. Further, the top case 80 surrounds an edge area (i.e., a bezel area) outside an effective display area of the liquid crystal display panel 60.

At least one heat generation sheet 5 is disposed between the reflection sheet 30 and the horizontal part 71 of the bottom cover 70. The heat generation sheet 5 emits radiant heat. The radiant heat generated in the heat generation sheet 5 is transferred to the liquid crystal display panel 60 by sequentially passing through the reflection sheet 30, the light guide plate 20, and the plurality of optical sheets 40. The radiant heat increases a surface temperature of the liquid crystal display panel 60, thereby contributing to an improvement of Ton/Toff characteristic of liquid crystals. The heat generation sheet 5 may solve a defect of the edge type backlight unit weak to the heat transfer and may greatly improve response characteristic of the liquid crystals.

The heat generation sheet 5 performs a heat generation operation based on an operation voltage received from the outside. For this, as shown in FIGS. 3A and 3B, the heat generation sheet 5 is connected to a light source driver 300 on a back surface of the bottom cover 70 through a power supply line 7. The light source driver 300 generates the operation voltage corresponding to a target temperature and supplies the operation voltage to the heat generation sheet 5 through the power supply line 7. The power supply line 7 passes through a draw-out hole 8 of the bottom cover 70 and electrically connects the heat generation sheet 5 to the light source driver 300.

Figure 4:
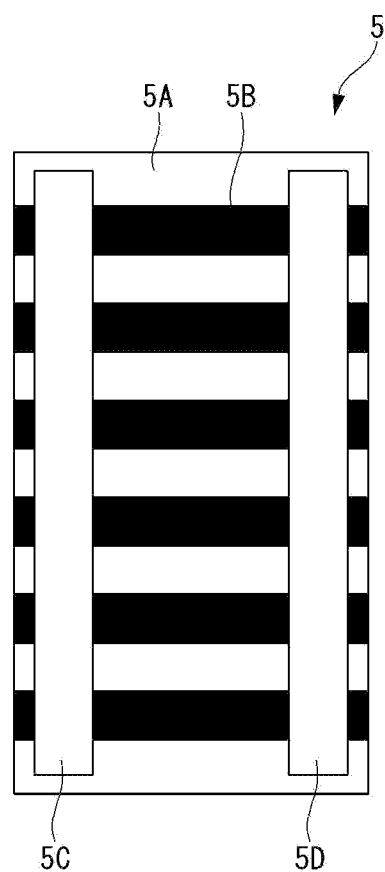
FIG. 4 illustrates a heat generation sheet according to an example embodiment of the invention.

FIG. 4 illustrates in detail the heat generation sheet 5. As shown in FIG. 4, the heat generation sheet 5 includes a base film 5A, a heat generation part 5B, a first electrode 5C, and a second electrode 5D.

The base film 5A may include a plastic material, for example, at least one of polycarbonate (PC), polymethylene methacrylate (PMMA), polyethylene terephthalate (PET), polyvinyl chloride (PVC), and acrylonitrile butadiene styrene (ABS). The base film 5A supports the heat generation part 5B, the first electrode 5C, and the second electrode 5D.

The heat generation part 5B includes a carbon material and generates radiant heat. The heat generation part 5B may be manufactured in various forms including a stripe form shown in FIG. 4.

The first electrode 5C is connected to the power supply line 7 and supplies the operation voltage to the heat generation part 5B. The second electrode 5D is connected to a ground power source and supplies a ground level voltage to the heat generation part 5B.

Figure 5:
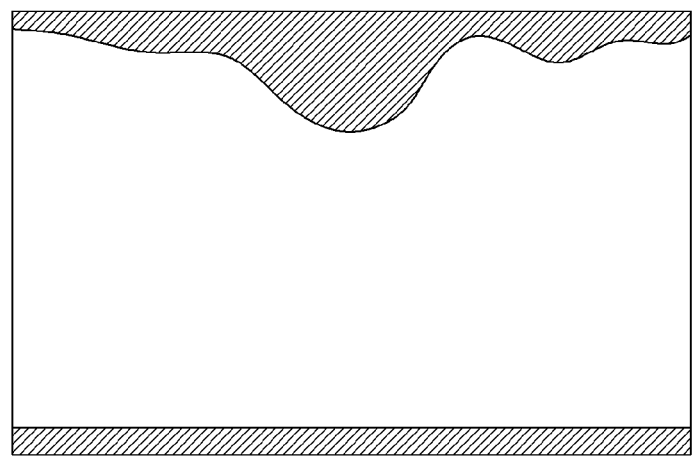
FIG. 5 illustrates a comparison between surface temperatures of a liquid crystal display panel before and after a heat generation sheet according to an example embodiment of the invention is applied.
Figure 5:
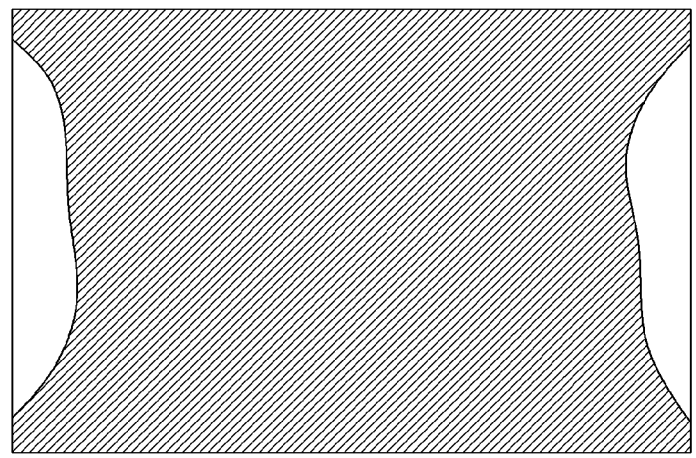
Figure 6:
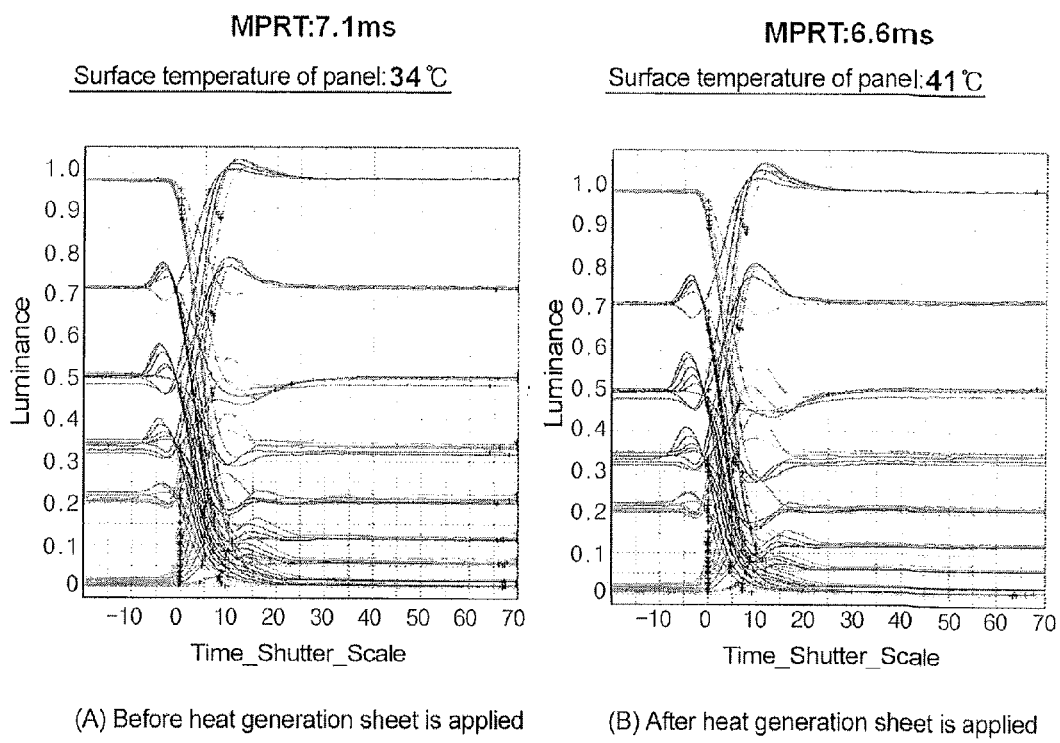
FIG. 6 illustrates the simulation result of a comparison between motion picture response time (MPRT) performances before and after a heat generation sheet according to an example embodiment of the invention is applied.

FIG. 5 illustrates a comparison between surface temperatures of a liquid crystal display panel before and after the heat generation sheet according to the example embodiment of the invention is applied. FIG. 6 illustrates the simulation result of a comparison between motion picture response time (MPRT) performances before and after the heat generation sheet according to the example embodiment of the invention is applied. FIG. 7 illustrates the simulation result of a comparison between 3D crosstalks before and after the heat generation sheet according to the example embodiment of the invention is applied.

As shown in FIG. 5, a surface temperature of a liquid crystal display panel after the heat generation sheet according to the example embodiment of the invention was applied greatly increased, as compared to before the heat generation sheet was applied. In FIG. 5, a portion in which a surface temperature is increased is shown slash parts. According to an experiment, when a 2D image was implemented, the surface temperature of the liquid crystal display panel increased from about 34° C. to about 41° C. by an operation of the heat generation sheet. Further, when a 3D image was implemented, the surface temperature of the liquid crystal display panel increased from about 31° C. to about 40° C. by the operation of the heat generation sheet. In the experiment, a turn-on duty ratio of light sources when the 2D image was implemented was set to 100%, and a turn-on duty ratio of the light sources when the 3D image was implemented was set to 30%.

When the surface temperature of the liquid crystal display panel increases, the response characteristic is improved. Hence, the MPRT performance is improved, and the 3D crosstalk is reduced.

As shown in FIG. 6, the MPRT performance after the heat generation sheet according to the example embodiment of the invention was applied was greatly improved, as compared to before the heat generation sheet was applied. According to an experiment, when the 2D image was implemented, the MPRT was reduced from about 7.1 ms to about 6.6 ms when the surface temperature of the liquid crystal display panel increased from about 34° C. to about 41° C. by the heat generation sheet. In the embodiment of the invention, the MPRT indicates, when the light sources are turned on at a regular duty ratio and a gray level of a display image changes from a first gray level (for example, a black gray level) to a second gray level (for example, a white gray level) by driving the liquid crystals, a response time required until a luminance value of the liquid crystal display panel reaches from about 10% to about 90% of a target luminance value for representing the second gray level. A reduction in the MPRT means that motion picture response characteristic becomes rapid. Hence, a motion blur is reduced, and the display quality is improved.

As shown in FIG. 7, the 3D crosstalk after the heat generation sheet according to the example embodiment of the invention was applied was greatly reduced, as compared to before the heat generation sheet was applied. According to an experiment, when the 3D image was implemented, the 3D crosstalk was reduced from about 3.25% to about 1.94% when the surface temperature of the liquid crystal display panel increased from about 31° C. to about 40° C. by the heat generation sheet. The 3D crosstalk C/T may be generally represented by the following Equation 1.

$$C/T\ [\%] = \frac{L_w R_b - B}{L_b R_w - B} \times 100.$$ [Equation 1]

In Equation 1 and FIG. 7, 'W' indicates a luminance value measured after a white image is displayed on the liquid crystal display panel, 'B' indicates a luminance value measured after a black image is displayed on the liquid crystal display panel, 'LwRb' indicates a luminance value measured after an image displayed on the liquid crystal display panel changes from a white left eye image to a black right eye image, and 'LbRw' indicates a luminance value measured after an image displayed on the liquid crystal display panel changes from a black left eye image to a white right eye image.

As the 3D crosstalk is reduced, a doubled image of the left eye image and the right eye image is reduced. As a result, the display quality of the liquid crystal display is improved.

As described above, the heat generation sheet according to the example embodiment of the invention is more effective in the liquid crystal display including the edge type backlight unit. However, the heat generation sheet according to the example embodiment of the invention is limited to the liquid crystal display including the edge type backlight unit. The heat generation sheet according to the example embodiment of the invention may be applied to the liquid crystal display including the direct type backlight unit shown in FIGS. 8A and 8B.

Figure 8A:
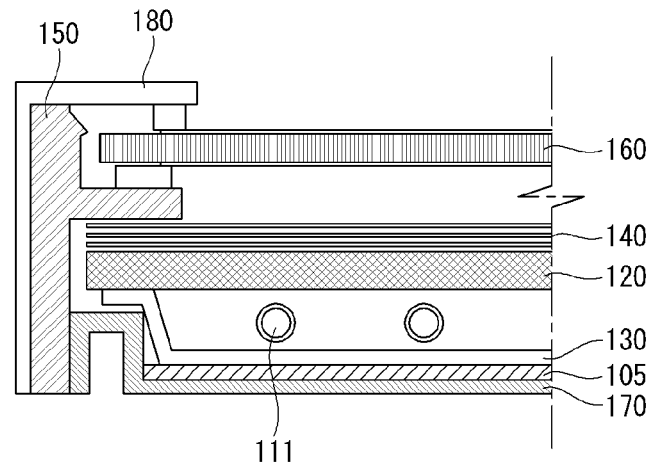
FIG. 8A is a partial cross-sectional view of a liquid crystal display including a direct type backlight unit using a lamp as a light source.
Figure 8B:
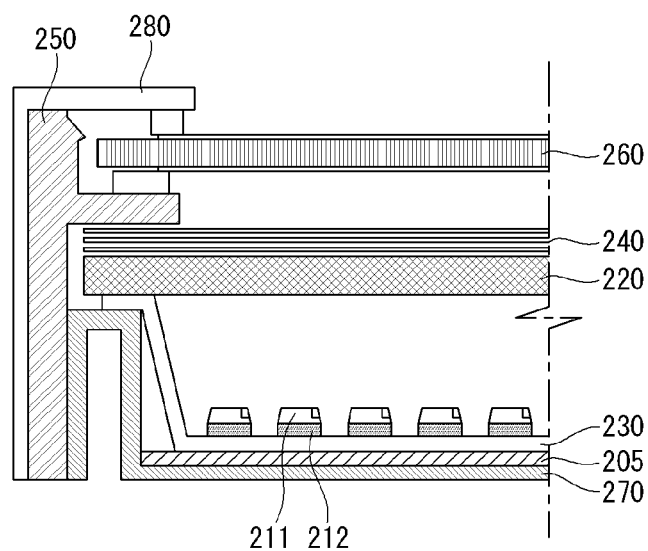
FIG. 8B is a partial cross-sectional view of a liquid crystal display including a direct type backlight unit using a light emitting diode (LED) as a light source.

FIG. 8A is a partial cross-sectional view of a liquid crystal display including a direct type backlight unit using a lamp as a light source. FIG. 8B is a partial cross-sectional view of a liquid crystal display including a direct type backlight unit using a LED as a light source.

A liquid crystal display shown in FIG. 8A includes a liquid crystal display panel 160, a guide panel 150, a backlight unit, a heat generation sheet 105, a bottom cover 170, and a top case 180. The backlight unit is implemented as a direct type backlight unit including a plurality of lamps 111, a diffusion plate 120 for diffusing light emitted from the lamps 111, a reflection sheet 130 disposed under the lamps 111, and a plurality of optical sheets 140 disposed on the diffusion plate 120. At least one heat generation sheet 105 is disposed between the reflection sheet 130 and the bottom cover 170 and emits radiant heat. The radiant heat generated in the heat generation sheet 105 is transferred to the liquid crystal display panel 160 by sequentially passing through the reflection sheet 130, the diffusion plate 120, and the plurality of optical sheets 140. The radiant heat generated in the heat generation sheet 105 and heat generated in the lamps 111 increase a surface temperature of the liquid crystal display panel 160, thereby contributing to an improvement of Ton/Toff characteristic of liquid crystals. The heat generation sheet 105 may maximize a merit of the direct type backlight unit, that is relatively advantageous in the heat transfer, and may greatly improve response characteristic of the liquid crystals.

A liquid crystal display shown in FIG. 8B includes a liquid crystal display panel 260, a guide panel 250, a backlight unit, a heat generation sheet 205, a bottom cover 270, and a top case 280. The backlight unit is implemented as a direct type backlight unit including a plurality of LEDs 211, a metal PCB 212 on which the LEDs 211 are mounted, a diffusion plate 220 for diffusing light emitted from the LEDs 211, a reflection sheet 230 disposed under the LEDs 211 and the metal PCB 212, and a plurality of optical sheets 240 disposed on the diffusion plate 220. At least one heat generation sheet 205 is disposed between the reflection sheet 230 and the bottom cover 270 and emits radiant heat. The radiant heat generated in the heat generation sheet 205 is transferred to the liquid crystal display panel 260 by sequentially passing through the reflection sheet 230, the diffusion plate 220, and the plurality of optical sheets 240. The radiant heat generated in the heat generation sheet 205 and heat generated in the LEDs 211 increase a surface temperature of the liquid crystal display panel 260, thereby contributing to an improvement of Ton/Toff characteristic of liquid crystals. The heat generation sheet 205 may maximize a merit of the direct type backlight unit, that is relatively advantageous in the heat transfer, and may greatly improve response characteristic of the liquid crystals.

As described above, the liquid crystal display according to the example embodiment of the invention includes at least one heat generation sheet between the backlight unit and the bottom cover and increases the surface temperature of the liquid crystal display panel using the radiant heat generated in the heat generation sheet. Hence, the liquid crystal display according to the example embodiment of the invention improves the Ton/Toff characteristic of the liquid crystals without the technical difficulty and the cost burden. As a result, the liquid crystal display according to the example embodiment of the invention improves the MPRT performance and reduces the 3D crosstalk through the improvement of the response characteristic of the liquid crystals, thereby greatly improving the display quality.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A liquid crystal display comprising:
   a liquid crystal display panel;
   a backlight unit configured to provide light to the liquid crystal display panel;
   a bottom cover configured to receive the backlight unit;
   at least one heat generation sheet disposed between the backlight unit and the bottom cover, the at least one heat generation sheet configured to generate a radiant heat for increasing a surface temperature of the liquid crystal display panel; and
   a light source driver configured to supply a driving power to a light source array of the backlight unit,
   wherein the at least one heat generation sheet is electrically connected to the light source driver through a power supply line and performs a heat generation operation based on an operation voltage received from the light source driver.

2. The liquid crystal display of claim 1, wherein the at least one heat generation sheet includes:
   a heat generation part configured to generate the radiant heat;
   a first electrode connected to the power supply line, the first electrode configured to supply the operation voltage to the heat generation part;
   a second electrode connected to a ground power source, the second electrode configured to supply a ground level voltage to the heat generation part; and
   a base film configured to support the heat generation part, the first electrode, and the second electrode.

3. The liquid crystal display of claim 2, wherein the heat generation part includes a carbon material.

4. The liquid crystal display of claim 1, wherein the backlight unit is implemented as an edge type backlight unit including a light source array, a light guide plate, that converts light coming from the light source array into plane light and emits the plane light to the liquid crystal display panel, an optical sheet disposed between the liquid crystal display panel and the light guide plate, and a reflection sheet disposed under the light guide plate,
   wherein the heat generation sheet is disposed between the reflection sheet and a bottom surface of the bottom cover.

5. The liquid crystal display of claim 4, wherein the radiant heat generated in the at least one heat generation sheet is transferred to the liquid crystal display panel by sequentially passing through the reflection sheet, the light guide plate, and the optical sheet.

6. The liquid crystal display of claim 4, wherein the light source array includes at least one of a light emitting diode (LED), a hot cathode fluorescent lamp (HCFL), a cold cathode fluorescent lamp (CCFL), and an external electrode fluorescent lamp (EEFL) as a light source.

7. The liquid crystal display of claim 1, wherein the backlight unit is implemented as a direct type backlight unit including a light source array, a diffusion plate, that diffuses light coming from the light source array and emits the light to the liquid crystal display panel, an optical sheet disposed between the liquid crystal display panel and the diffusion plate, and a reflection sheet disposed under the light source array, wherein the heat generation sheet is disposed between the reflection sheet and a bottom surface of the bottom cover.

8. The liquid crystal display of claim 7, wherein the radiant heat generated in the at least one heat generation sheet is transferred to the liquid crystal display panel by sequentially passing through the reflection sheet, the diffusion plate, and the optical sheet.

9. The liquid crystal display of claim 7, wherein the light source array includes at least one of a light emitting diode (LED), a hot cathode fluorescent lamp (HCFL), a cold cathode fluorescent lamp (CCFL), and an external electrode fluorescent lamp (EEFL) as a light source.

* * * * *